US010574964B2

United States Patent
Borel (10) Patent No.: US 10,574,964 B2
(45) Date of Patent: Feb. 25, 2020

(54) METHOD, APPARATUS AND SYSTEM FOR REDUCING CROSSTALK OF AUTO STEREOSCOPIC DISPLAYS

(71) Applicant: THOMSON LICENSING, Issy les Moulineaux (FR)

(72) Inventor: Thierry Borel, Rennes (FR)

(73) Assignee: InterDigital CE Patent Holdings, Paris (FR)

( * ) Notice: Subject to any disclaimer, the term of this patent is extended or adjusted under 35 U.S.C. 154(b) by 69 days.

(21) Appl. No.: 15/539,433

(22) PCT Filed: Dec. 22, 2015

(86) PCT No.: PCT/EP2015/081089
§ 371 (c)(1),
(2) Date: Jun. 23, 2017

(87) PCT Pub. No.: WO2016/102627
PCT Pub. Date: Jun. 30, 2016

(65) Prior Publication Data
US 2017/0374346 A1  Dec. 28, 2017

(30) Foreign Application Priority Data
Dec. 23, 2014 (EP) .................................. 14307155

(51) Int. Cl.
H04N 13/00 (2018.01)
H04N 13/133 (2018.01)
H04N 13/122 (2018.01)
H04N 13/302 (2018.01)
G06T 15/00 (2011.01)
H04N 13/167 (2018.01)
(Continued)

(52) U.S. Cl.
CPC ........... H04N 13/133 (2018.05); G06T 15/00 (2013.01); H04N 13/122 (2018.05); H04N 13/167 (2018.05); H04N 13/302 (2018.05); H04N 13/305 (2018.05); H04N 13/351 (2018.05)

(58) Field of Classification Search
CPC ............................... G06T 15/00; H04N 13/00
See application file for complete search history.

(56) References Cited

U.S. PATENT DOCUMENTS

| 7,773,049 B2 | 8/2010 | Ueno et al. |
| 2011/0164036 A1 | 7/2011 | Dezwart et al. |
| 2011/0285700 A1* | 11/2011 | Kim ................... G02B 27/0093 345/419 |

FOREIGN PATENT DOCUMENTS

GB   2422737   8/2006

OTHER PUBLICATIONS

Li et al., "Crosstalk reduction in multi-view autostereoscopic three-dimensional display based on lenticular sheet", Chinese Optics Letters, vol. 9, No. 2, Feb. 10, 2011, pp. 1-3.

(Continued)

Primary Examiner — Maryam A Nasri
(74) Attorney, Agent, or Firm — Jack Schwartz & Associates, PLLC (57) ABSTRACT

The disclosure describes a method, apparatus and system for reducing crosstalk of auto-stereoscopic displays using higher resolution panels. In such panels, a fraction of a total number of views is generated by sending a same signal on a number of adjacent views. A signal processing correcting function is applied to the fractioned views to reduce crosstalk.

12 Claims, 8 Drawing Sheets

(51) Int. Cl.
*H04N 13/305* (2018.01)
*H04N 13/351* (2018.01)

(56) References Cited

OTHER PUBLICATIONS

Li et al., "Image Processing to Eliminate Crosstalk Between Neighboring View Images in Three-Dimensional Lenticular Display", Journal of Display Technology, vol. 7, No. 6, Aug. 2011, pp. 443-447.

Li et al., "A Method to Eliminate Image Crosstalk in Autostereoscopic Display Based on Lenticular Sheet", Journal of Sichuan University, Engineering Science Edition, vol. 43, No. 6, Nov. 2011, pp. 115-118. English Abstract.

* cited by examiner

FIG. 1

Luminance profile of a typical 8-view AS-3D display depending on screen areas

FIG. 2

Luminance profile of a 32-view AS-3D display

FIG. 3

8-view profile from a 32-view display

METHOD, APPARATUS AND SYSTEM FOR REDUCING CROSSTALK OF AUTO STEREOSCOPIC DISPLAYS

This application claims the benefit, under 35 U.S.C. § 365 of International Application PCT/EP2015/081089, filed Dec. 22, 2015, which was published in accordance with PCT Article 21(2) on Jun. 30, 2016, in English, and which claims the benefit of European Patent Application No. 14307155.3 filed Dec. 23, 2014.

TECHNICAL FIELD

The present invention relate to stereoscopic displays. More particularly, the present invention relates to a method, apparatus and system for reducing crosstalk on auto-stereoscopic displays.

BACKGROUND

One of the reasons why 3DTV has not developed into the consumer premises as initially expected is that viewers generally have to wear 3D stereo glasses, whether it be passive or active glasses. In the past few years however, display manufacturers started to develop auto-stereoscopic 3D displays (AS-3D) using either parallax barriers or micro-lens arrays. Unfortunately, for such displays, the micro-lens optical transfer function is not perfect and the lens luminance profile as a function of the viewing angle is similar to a Gaussian curve.

SUMMARY

The present invention propose a method, apparatus and system for reducing crosstalk of auto-stereoscopic displays.

In one embodiment of the present invention a method for reducing crosstalk of auto-stereoscopic displays includes generating a fraction of a total number of views of the display, each fractioned view having a number of sub-views, and determining a correction function to apply to the sub-views of at least one fractioned view of the display, using information regarding a signal strength distribution of images reproduced on the display across the sub-views of the at least one fractioned view and reproducing images on the display using at least the at least one fractioned view while applying the correction function to the sub-views of the fractioned views to reduce crosstalk between the fractioned views of the display.

In an alternate embodiment of the present invention an apparatus for reducing crosstalk of a display includes a memory for storing at least one of a group comprising program routines, information regarding signal distribution across views of a display, crosstalk information and data, and a processor for executing the program routines. In such embodiments, the processor is configured to generate a fraction of a total number of views of the display, each fractioned view having a number of sub-views, and to determine a correction function to apply to the sub-views of at least one fractioned view of the display, using information regarding a signal strength distribution of images reproduced on the display across the sub-views of the at least one fractioned view. The processor is further configured to reproduce images on the display using at least the at least one fractioned view while applying the correction function to the sub-views of the fractioned views to reduce crosstalk between the fractioned views of the display.

In an alternate embodiment of the present invention a system for reducing crosstalk of a display includes a measurement device measuring luminance of images reproduced on the display to determine a signal strength distribution of images reproduced on the display across sub-views of at least one view of the display and an apparatus including a memory for storing at least one of a group comprising program routines, information regarding signal distribution across views of a display, crosstalk information and data and a processor for executing the program routines. In such embodiments, the apparatus is configured to generate a fraction of a total number of views of the display, each fractioned view having a number of sub-views, and to determine a correction function to apply to the sub-views of at least one fractioned view of the display, using information regarding a signal strength distribution of images reproduced on the display across the sub-views of the at least one fractioned view. The apparatus is further configured to reproduce images on the display using at least the at least one fractioned view while applying the correction function to the sub-views of the fractioned views to reduce crosstalk between the fractioned views of the display.

BRIEF DESCRIPTION OF THE DRAWINGS

The teachings of the present invention can be readily understood by considering the following detailed description in conjunction with the accompanying drawings, in which.

It should be understood that the drawing(s) are for purposes of illustrating the concepts of the various described invention and are not necessarily the only possible configuration for illustrating the invention.

To facilitate understanding, identical reference numerals have been used, where possible, to designate identical elements that are common to the figures.

DETAILED DESCRIPTION

Embodiments of the present invention advantageously provide a method, apparatus and system for reducing crosstalk of auto-stereoscopic displays. Although the present invention will be described primarily within the context of specific displays having detailed resolutions, the specific embodiments of the present invention should not be treated as limiting the scope of the invention. It will be appreciated by those skilled in the art that the present invention can be advantageously applied to any such displays to reduce crosstalk in accordance with the embodiments of the present invention described and alluded to herein.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present invention as defined by such claims reside in the fact that the functionalities provided by the various recited means are combined and brought together in the manner which the claims call for. It is thus regarded that any means that can provide those functionalities are equivalent to those shown herein.

Moreover, all statements herein reciting invention, aspects, and embodiments of the present invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting invention, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

Furthermore, because some of the constituent system components and methods depicted in the accompanying drawings can be implemented in software, the actual connections between the system components or the process function blocks may differ depending upon the manner in which the present invention are programmed. Given the teachings herein, one of ordinary skill in the pertinent art will be able to contemplate these and similar implementations or configurations of the present invention.

Embodiments of the present invention provide a method, apparatus and system for reducing crosstalk of auto-stereoscopic displays which takes advantage of higher resolution displays (e.g., 4K, 8K). In accordance with one embodiment of the present invention, crosstalk of auto-stereoscopic displays is reduced by determining a fraction of a total number of views to generate and adjusting the luminance profile coming out of the micro-lenses of the display through signal processing.

Figure 1:
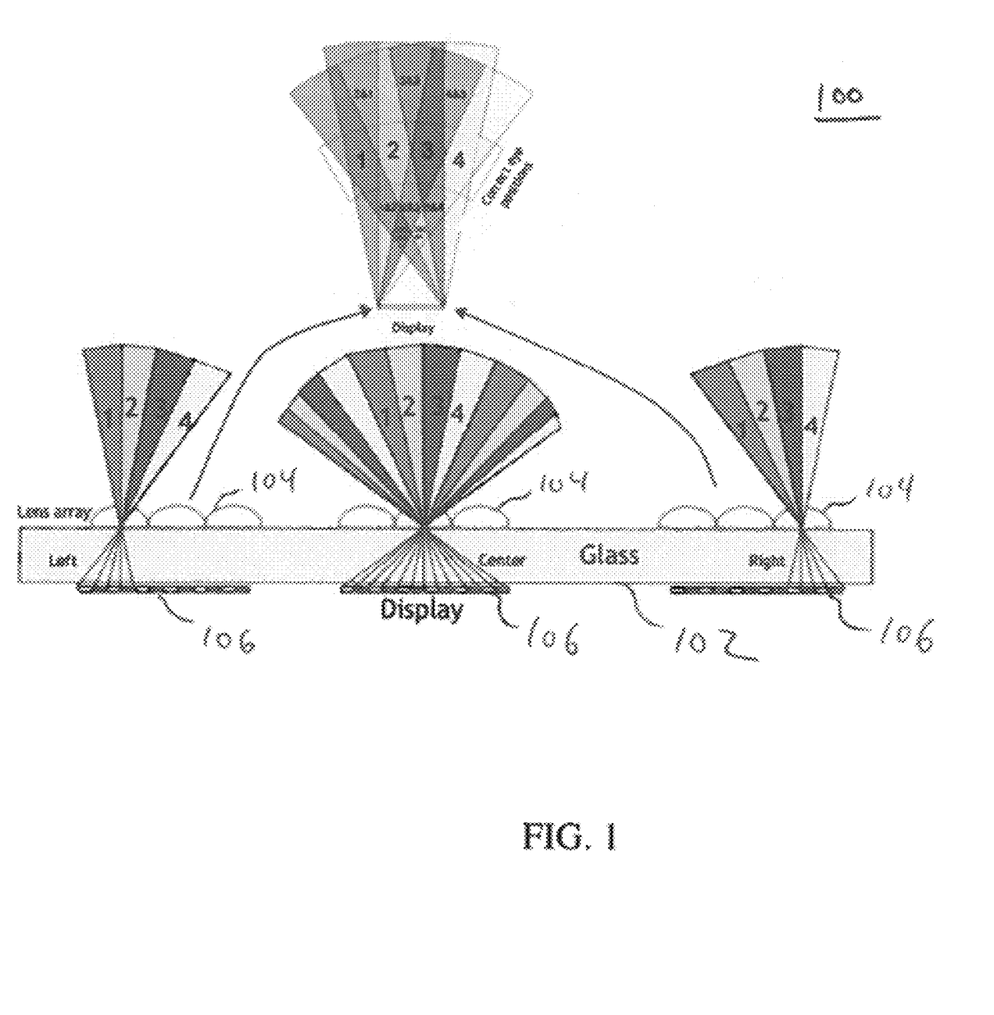
FIG. 1 depicts a high level block diagram of an arrangement of micro-lenses on the glass of a theoretical AS-3D display, the micro-lenses having perfect placement and theoretically perfect optical transfer function.

FIG. 1 depicts a high level block diagram of an arrangement of micro-lenses on the glass of a theoretical AS-3D display, the micro-lenses having perfect placement and theoretically perfect optical transfer function. That is, the AS-3D display 100 of FIG. 1 illustratively comprises a glass panel 102, a plurality of micro-lenses, collectively 104 and a plurality of pixels, collectively 106. The example of FIG. 1 comprises a 4-view display in which one sub-pixel is used for one view. As depicted in the overview depiction of FIG. 1, each view (1-4), whatever the pixel position on the panel, is converging into an optimum area (e.g., correct eye position) for viewing 3D. In the theoretical AS-3D display of FIG. 1, no crosstalk exists between the views.

Figure 2:
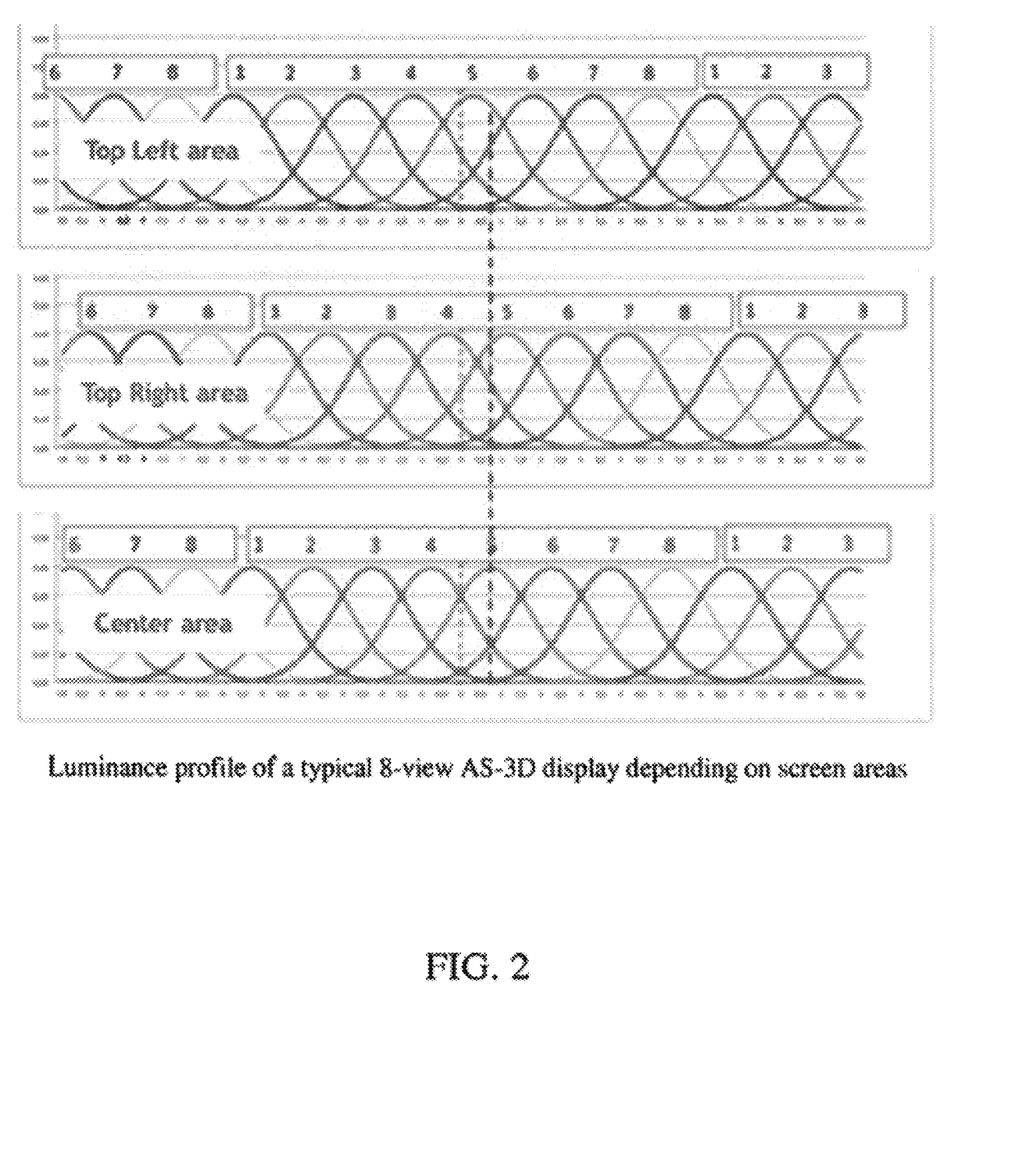
FIG. 2 depicts a graphical representation of a luminance profile of a typical 8-view AS-3D display having a real world optical transfer function resulting in the lens luminance profile as a function of the viewing angle of the micro-lenses to be more like a Gaussian curve.

FIG. 2 depicts a graphical representation of a luminance profile of a typical 8-view AS-3D display having a real world optical transfer function resulting in the lens luminance profile as a function of the viewing angle of the micro-lenses to be more like a Gaussian curve. In the 8-view AS-3D display of FIG. 2, for a given viewing angle, the eye can see at least 3 (sometimes 4) different views at the same time, which creates some undesirable ghosting artifacts on object edges. In addition, some profile non-homogeneities can appear on top and bottom corners of the screen versus the screen center.

Figure 3:
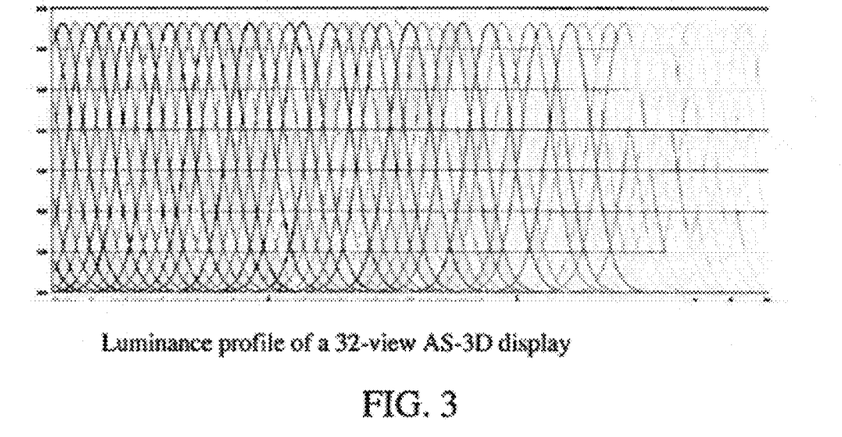
FIG. 3 depicts a graphical representation of a luminance profile of a typical ultra-high-definition (UHD) AS-3D display.

FIG. 3 depicts a graphical representation of a luminance profile of a typical ultra-high-definition (UHD) AS-3D display. More specifically, FIG. 3 presents the luminance profile of a UHD AS-3D display having significantly increased resolution and specifically from an 8-View HDTV panel to a 32-view UHDTV panel, multiplying the resolution by 4. In the display of FIG. 3, it should be noted that the number of lenses has not been changed, only the number of sub-pixels under each lens has been multiplied by 4. The luminance profile of each view can be modeled as a Gaussian curve according to equation one (1), which follows:

$$L_i = \frac{1}{\sigma\sqrt{2\pi}} e^{-\frac{1}{2}\left(\frac{\alpha-\mu_i}{\sigma}\right)^2} \quad (1)$$

where $L_i$ ($\alpha$) represents the luminance profile of view i, $\alpha$ represents the horizontal angle, $\mu_i$ represents the angular position of view i. $\sigma$ represents the standard deviation of the Gaussian curve and characterizes the optical quality of the lens. The smaller the value of σ, the better the crosstalk ratio. As depicted in FIG. 3, it does not make sense to generate real 32-view content for the UHD AS-3D display since the high degree of crosstalk would prevent the user to distinguish each view independently.

Figure 4:
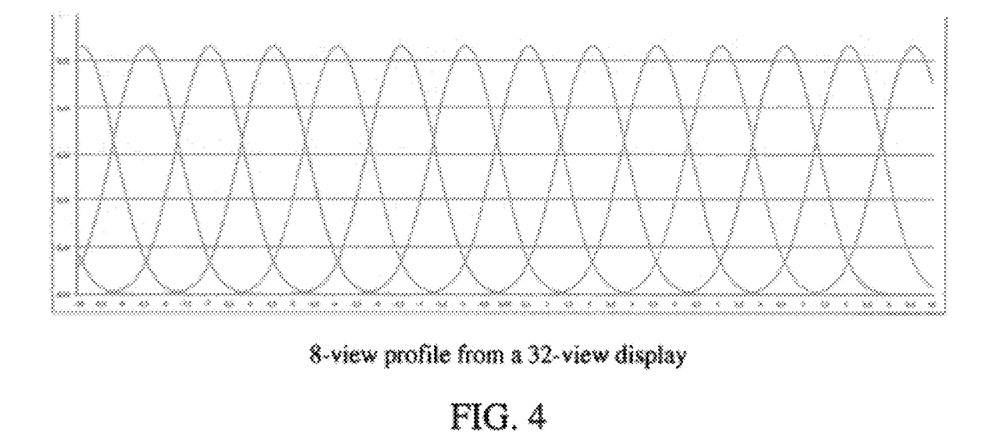
FIG. 4 depicts a graphical representation of a luminance profile of an ultra-high-definition (UHD) AS-3D display configured in accordance with an embodiment of the present invention.

As such, in accordance with an embodiment of the present invention, a fraction of a total number of views is generated by sending the same signal on adjacent views. Subsequently, a signal processing correcting function is applied to each adjacent view to reduce crosstalk. For example, for the UHD AS-3D display of FIG. 3, 8 views are generated from the 32 views by sending a same signal on 4 adjacent views. FIG. 4 depicts a graphical representation of a luminance profile of a the UHD AS-3D display of FIG. 3 configured in accordance with an embodiment of the present invention to contain only 8 views as described above. As depicted in FIG. 4, the number of views has been reduced from 32 to 8, which results in each view having 4 sub-views/pixels.

Figure 5:
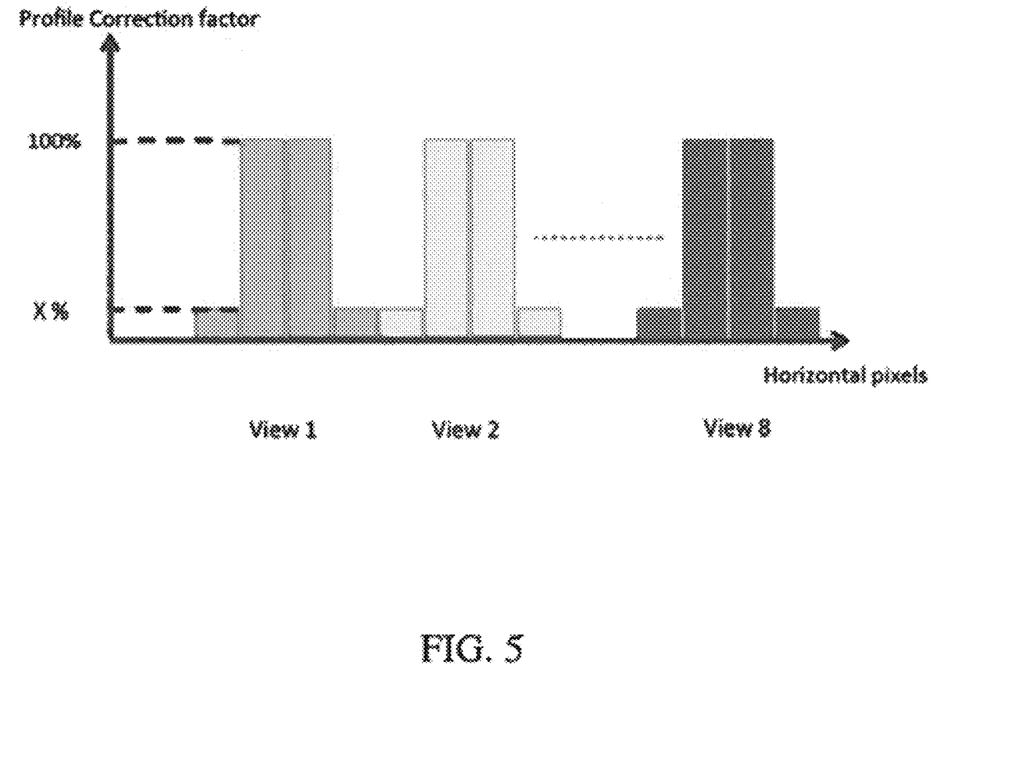
FIG. 5 depicts a graphical representation of a correction function in accordance with an embodiment of the present invention.

As previously recited, in accordance with an embodiment of the present invention, after sub-dividing a total number of views a signal processing correcting function is applied to each adjacent view to reduce (decrease) crosstalk. FIG. 5 depicts a graphical representation of a correction function in accordance with an embodiment of the present invention. In the embodiment of FIG. 5 a signal profile of the 4 sub-pixels of each of the 8 views is depicted. As depicted in FIG. 5, a first sub-pixel signal profile and fourth sub-pixel signal profile are labeled as having X % signal strength in the y-axis and second and third sub-pixel signal profiles are labeled as having 100% signal strength in the y-axis. The graphical representation of the signal strengths of the 4 sub-pixels of each view in FIG. 5 depict the expected Gaussian distribution of the signal strength across the 4 sub-pixels for each view.

Figure 6A:
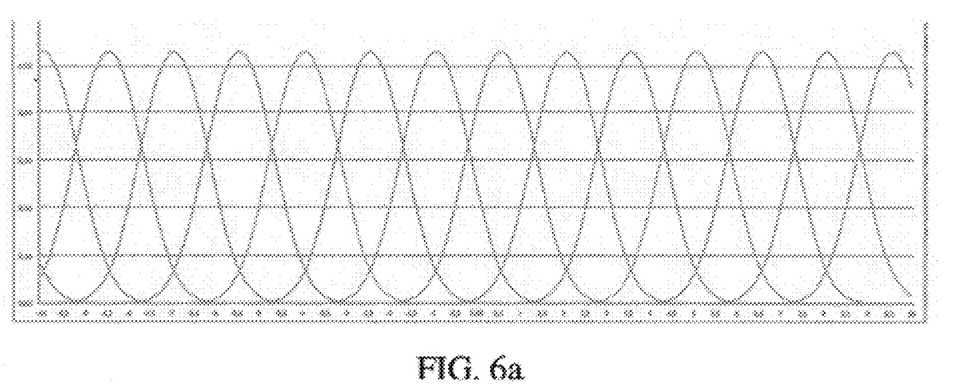
FIG. 6a depicts a graphical representation of the luminance profile of the (UHD) AS-3D display of FIG. 3 before any signal processing correction function.
Figure 6B:
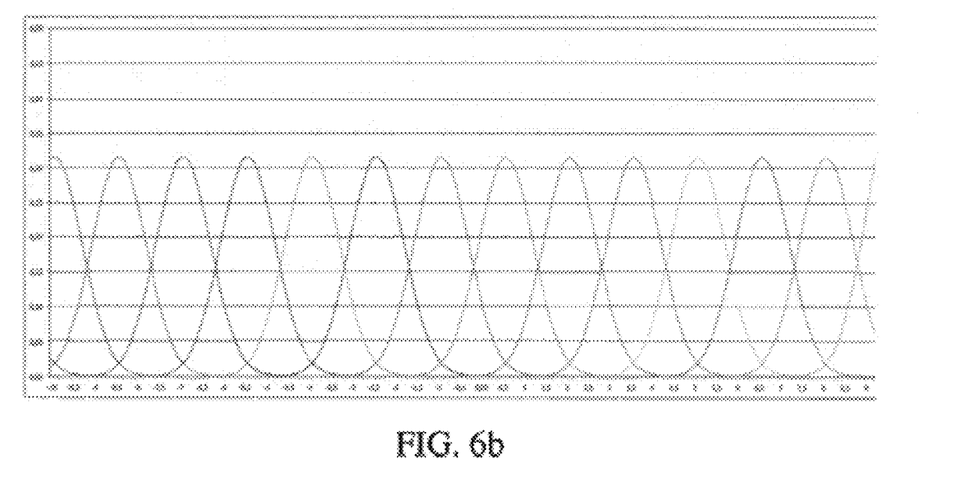
FIG. 6b depicts a graphical representation of the luminance profile of the (UHD) AS-3D display of FIG. 3 after the signal processing correction function in accordance with an embodiment of the present invention.

In one embodiment of the present invention, the value of X is set to 0% to essentially eliminate the signal (blacken) from the first and fourth sub-pixel of a view. As a result, the crosstalk level between views is drastically reduced. For example, FIG. 6a depicts a graphical representation of the luminance profile of the (UHD) AS-3D display of FIG. 3 having 8 views before any signal processing correction function of the present invention. FIG. 6b depicts a graphical representation of the luminance profile of the (UHD) AS-3D display of FIG. 3 having 8 views after the signal processing correction function of the present invention depicted in FIG. 5. As depicted in a comparison of FIGS. 6a and 6b, the crosstalk level between views is drastically reduced. It should be noted that the exact level of crosstalk reduction depends on the lens quality (σ) and the correction profile itself. For example, in the embodiment depicted in FIGS. 6a and 6b, with σ=0.6 and X=0%, the crosstalk is 15.4% before correction and 3.1% after correction in accordance with an embodiment of the present invention.

Figure 7:
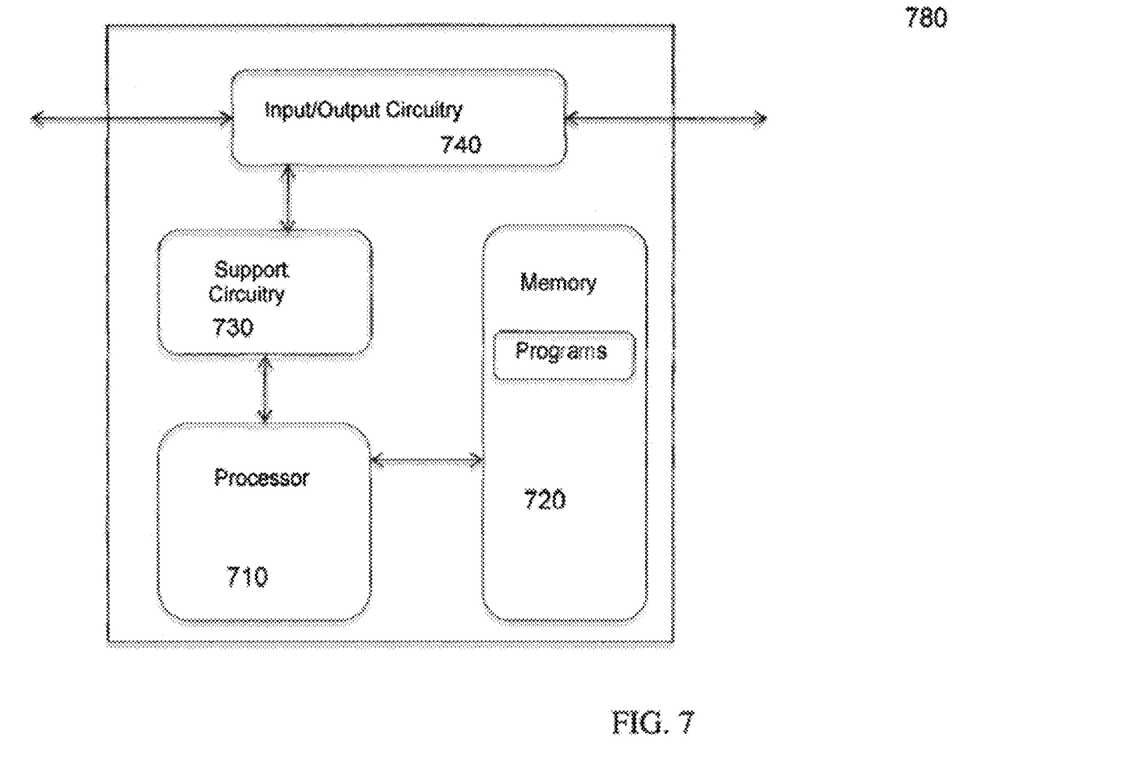
FIG. 7 depicts a high level block diagram of an apparatus for reducing crosstalk of auto-stereoscopic displays in accordance with an embodiment of the present invention.

FIG. 7 depicts a high level block diagram of an apparatus for reducing crosstalk of stereoscopic displays in accordance with an embodiment of the present invention. In the embodiment of FIG. 7, the apparatus is illustratively depicted as display controller 780. The display controller 780 of FIG. 7 illustratively comprises a processor 710 as well as a memory 720 for storing one or more control programs/software routines, display information and the like. The processor 710 cooperates with conventional support circuitry 730 such as power supplies, clock circuits, cache memory and the like as well as circuits that assist in executing the software routines (not shown) stored in the memory 720. As such, it is contemplated that some of the process steps discussed herein as software processes can be implemented within hardware, for example, as circuitry that cooperates with the processor 710 to perform various steps. The display controller 780 also contains input-output circuitry 740 that forms an interface between various functional elements communicating with the processing apparatus.

Although the display controller 780 of FIG. 7 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software executed by a processor, hardware, or a combination thereof. In addition, although the display controller 780 of FIG. 7 is depicted as an integrated component of a display 830 (See FIG. 8), the functionalities of the display controller 780 in accordance with the concepts and embodiments of the present invention described herein can take the form of an external component for controlling a display such as a set-top box, server and the like.

In one embodiment of the present invention, a display controller of the present invention, such as the display controller 780 of FIG. 7, receives information regarding a luminance profile for a given display, such as an UHD AS-3D display. In one embodiment of the present invention, a display controller of the present invention can receive such information from a manufacturer of the display at which, during the quality analysis process performed on the display in the factory, crosstalk of the display can be measured at a pixel or group of pixels level. Such information can then be downloaded into a look-up table and communicated to the display controller.

Having such information, a display controller of the present invention makes a determination as to what fraction of a total number of views to generate by sending the same signal on adjacent views. That is, as described above, in accordance with embodiments of the present invention, a fraction of a total number of views is generated by sending the same signal on adjacent views. Subsequently, a signal processing correcting function is applied to each adjacent view to decrease crosstalk. That is and as described above, in accordance with various embodiments of the present invention, crosstalk of auto-stereoscopic displays can be reduced by generating a fraction of a total number of views and applying a correction function to adjacent views. In various embodiments of the present invention, depending on at least one of a display type, the size of the display and the sizes of the sub-pixels of the display, an estimation of an amount of crosstalk exhibited by that display, and subsequently a fraction of a total number of views to generate and a signal processing correction function to be applied, can be determined. For example, during the quality analysis process of a display in the factory, a luminance profile of the display across at least some of the views of the displays can be measured and a number of views and a signal processing correction function that best reduces crosstalk can be determined as described above. Such information can be downloaded into a memory and communicated to a display controller of the present invention. Subsequently, for displays having similar properties (e.g., type of display, size of display, number and size of pixels and the like), it can be assumed that such displays should be reduced to a similar number of views and have a similar processing correction function applied to most effectively reduce crosstalk.

In an alternate embodiment of the present invention, a display controller of the present invention is incorporated into a measurement system. In such an embodiment, a trial and error process is used to determine a total number of views to generate by sending the same signal on adjacent views and a signal processing correcting function to apply to each adjacent view to decrease crosstalk. For example, FIG. 8 depicts a high level block diagram of a measurement system for reducing crosstalk of auto-stereoscopic displays in accordance with an embodiment of the present invention.

Figure 8:
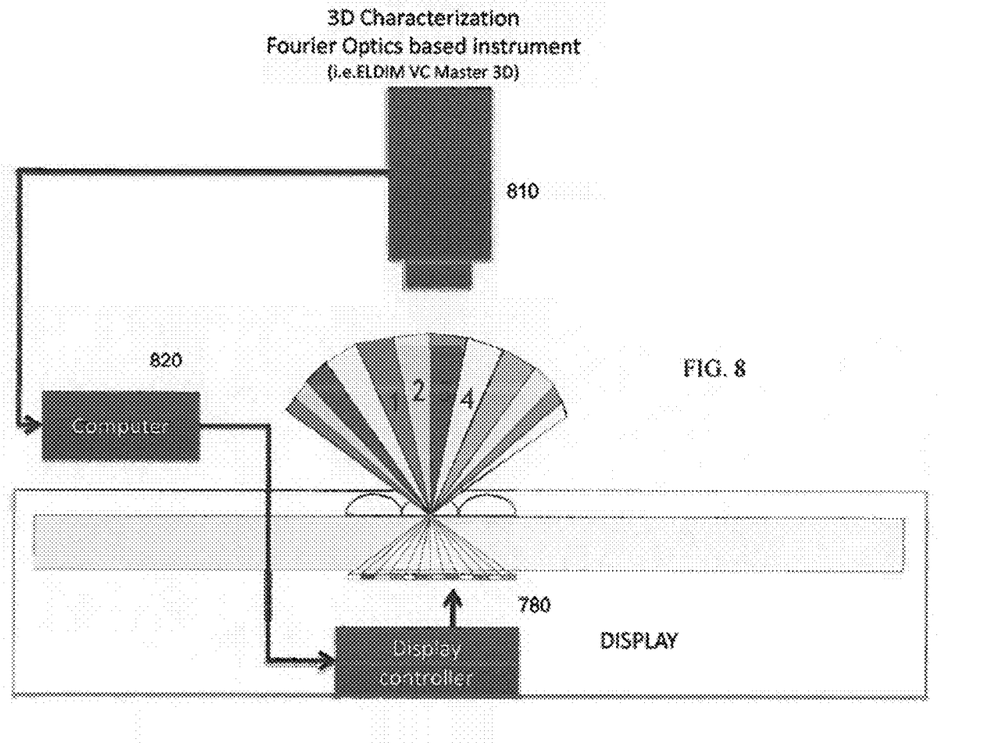
FIG. 8 depicts a high level block diagram of a system for reducing crosstalk of auto-stereoscopic displays in accordance with an embodiment of the present invention.

The system 800 of FIG. 8 illustratively includes a 3D characterization device 810 based on Fourier Optics concept (for instance ELDIM VCMaster3D) for taking image measurements. The 3D characterization data is acquired by a processing unit 820, which is in communication with the display controller 780. In the embodiment of FIG. 8, the 3D characterization device 810 measures the 3D image and a crosstalk value. The processing unit 820 receives the crosstalk value and determines a number of views to generate by sending the same signal on adjacent views. The processing unit 820 also determines a signal processing correcting function, as described above, to apply to each adjacent view to attempt to decrease crosstalk. The processing unit 820 then communicates the information to the display controller 780. The display controller 780 applies the determined number of views and signal processing correction function to an associated display. Images are then displayed on the display using the determined number of views and the correction function is applied to reduce the crosstalk.

The images with reduced crosstalk can again be measured by the 3D characterization device 810 and new data acquired by the processing unit 820. The processing unit 820 can then determine another number of views to generate and a signal processing correcting function, as described above, to apply to each new adjacent view to attempt to decrease crosstalk further.

As such, an optimum number of views and signal processing correcting function to be applied to the views is determined. Such determinations can be stored in a memory of the display controller 780 of the present invention. Although in the embodiment of FIG. 8, the system 800 comprises a separate processing unit 820 and display controller 780, in alternate embodiments of the present invention, the processing unit 820 and display controller 780 can comprise a single, integrated component.

Generally, in accordance with embodiments of the present invention, a trial and error process is performed to approach an image with a most reduced crosstalk to determine a best number of sub-views to generate and a most effective signal processing correcting function to apply to the views. That is, as described above a number of sub-views can be generated by sending a same signal on adjacent views and then a signal processing correcting function is determined, as described above, to apply to each adjacent view to attempt to decrease crosstalk. The process can be repeated until a minimum crosstalk is achieved for images being reproduced on an associated display.

Figure 9:
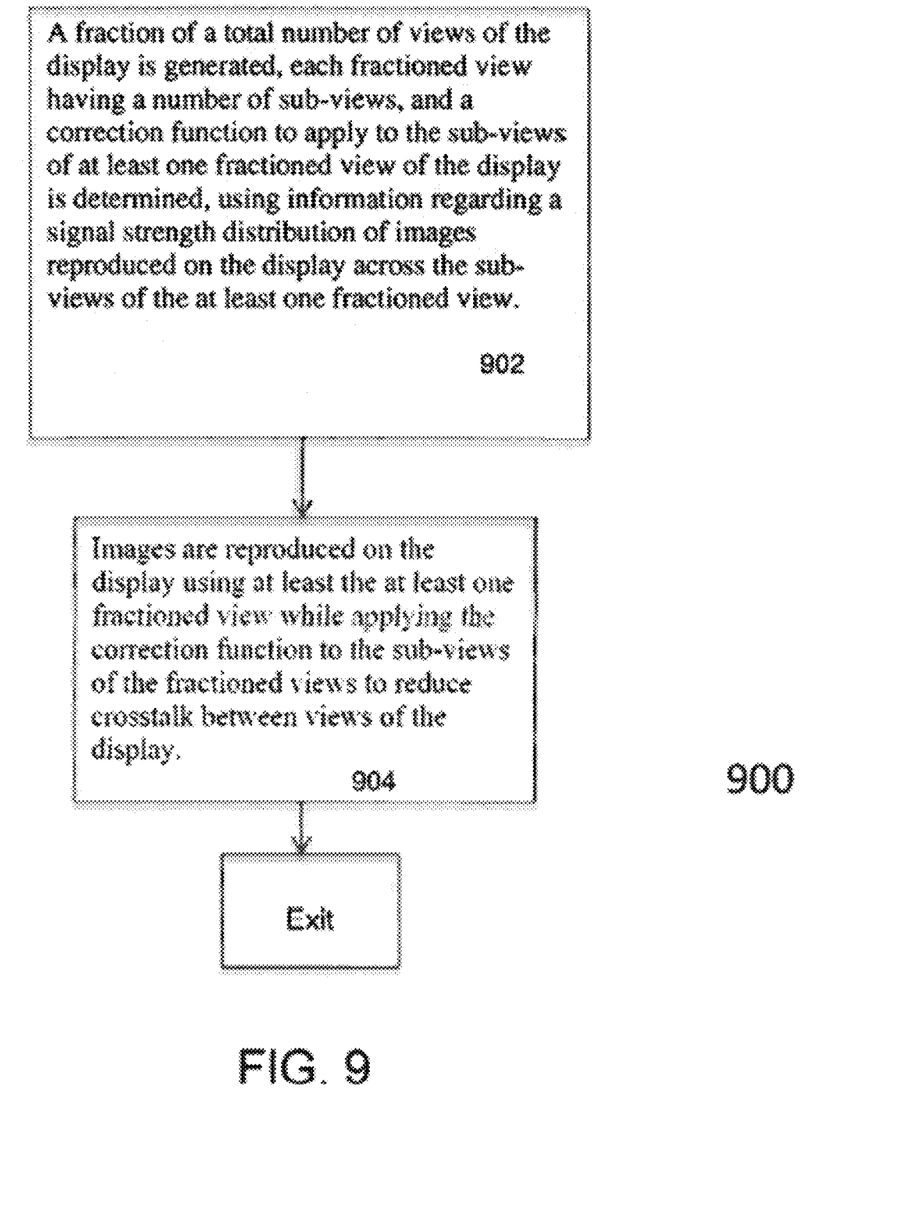
FIG. 9 depicts a flow diagram for a method for reducing crosstalk of auto-stereoscopic displays in accordance with an embodiment of the present invention.

FIG. 9 depicts a flow diagram for a method for reducing crosstalk of stereoscopic displays in accordance with an embodiment of the present invention. The method 900 begins at step 902 during which a fraction of a total number of views of the display is generated, each fractioned view having a number of sub-views, and a correction function to apply to the sub-views of at least one fractioned view of the display is determined using information regarding a signal strength distribution of images reproduced on the display across the sub-views of the at least one fractioned view. That is, as described above, in one embodiment of the present invention, a display controller of the present invention can receive information regarding a signal strength distribution of images reproduced on the display across the sub-views of at least one view from, for example, a manufacturer of an auto-stereoscopic display. In alternate embodiments of the present invention, a display controller of the present invention can comprise a component of a measurement system in which information regarding the signal strength distribution of images reproduced on the display across the sub-views of at least one view of a display can be measured by the measurement system. Having such information, a display controller of the present invention can then determine a number of sub-views to generate and a correction function to apply to the sub-views of at least one view to reduce crosstalk as described above. The method 900 can then proceed to step 904.

At step 904, images are reproduced on the display using at least the at least one fractioned view while applying the correction function to the sub-views of the fractioned views to reduce crosstalk between views of the display. The method 900 can then be exited.

The present description illustrates embodiments of the present invention. It will thus be appreciated that those skilled in the art will be able to devise various arrangements that, although not explicitly described or shown herein, embody the present invention and are included within its scope. That is, having described various embodiments for a method, apparatus and system for reducing crosstalk of auto-stereoscopic displays (which are intended to be illustrative and not limiting), it is noted that modifications and variations can be made by persons skilled in the art in light of the above teachings. It is therefore to be understood that changes can be made in the particular embodiments of the present invention disclosed which are within the scope of the invention. While the forgoing is directed to various embodiments of the present invention, other and further embodiments of the invention may be devised without departing from the basic scope thereof.

The invention claimed is:

1. A method for reducing crosstalk of a display, said display being adapted to display a first number of views, comprising:

reducing said first number of views to a second number of views less than said first number of views by applying a second number of image signals to the views of the first number of views, wherein each of the image signals of the second number of image signals is applied to groups of adjacent views of said first number of views, each of said groups of adjacent views including a respective group of adjacent pixels;

for at least one group of adjacent pixels, adjusting a luminance profile of said pixels of said at least one group by reducing a luminance of pixels located at a periphery on each side of said at least one group with respect to a luminance of other pixels of said group; and reproducing images on the display using the second number of views with said adjusted luminance profile.

2. The method according to claim 1, wherein the level of luminance of the pixels located at the periphery of said groups of adjacent pixels is a percentage of the level of luminance of the other pixels of said groups of adjacent pixels.

3. The method according to claim 1, wherein the level of luminance of the pixels located at the periphery of said groups of adjacent pixels is equal to 0.

4. The method according to claim 1, wherein the luminance is reduced by applying a correction function to said groups of adjacent pixels.

5. The method according to claim 4, wherein said second number and said correction function are determined with a trial and error process.

6. The method according to claim 1, wherein said second number is determined according to characteristics of said display.

7. An apparatus configured to reduce crosstalk of a display, said display being adapted to display a first number of views, said apparatus comprising a memory associated with a processor configured to:
   reduce said first number of views to a second number of views less than said first number of views by applying a second number of image signals to the views of the first number of views, wherein each of the image signals of the second number of image signals is applied to groups of adjacent views of said first number of views, each of said groups of adjacent views including a respective group of adjacent pixels;
   for at least one group of adjacent pixels, adjust a luminance profile of said pixels of said at least one group by reducing a luminance of pixels located at a periphery on each side of said at least one group with respect to a luminance of other pixels of said group; and
   reproduce images on the display using the second number of views with said adjusted luminance profile.

8. The apparatus according to claim 7, wherein the level of luminance of the pixels located at the periphery of said groups of adjacent pixels is a percentage of the level of luminance of the other pixels of said groups of adjacent pixels.

9. The apparatus according to claim 7, wherein the level of luminance of the pixels located at the periphery of said groups of adjacent pixels is equal to 0.

10. The apparatus according to claim 7, wherein the processor is configured to reduce the luminance by applying a correction function to said groups of adjacent pixels.

11. The apparatus according to claim 10, wherein said processor is further configured to determine said second number and said correction function with a trial and error process.

12. The apparatus according to claim 7, wherein said second number is determined according to characteristics of said display.

* * * * *